No. 627,523. Patented June 27, 1899.
E. J. PENNINGTON.
MOTOR VEHICLE.
(Application filed Dec. 30, 1897.)
(No Model.) 2 Sheets—Sheet 1.
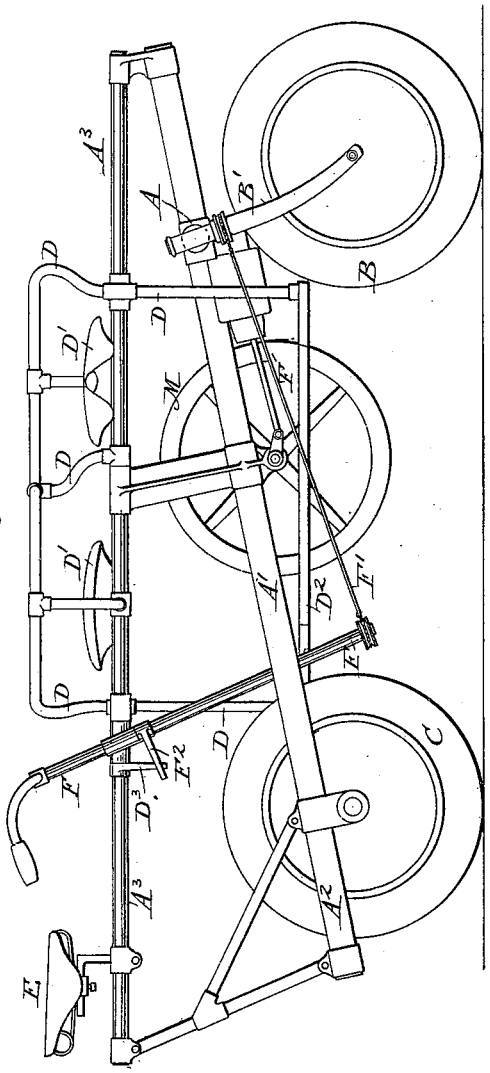
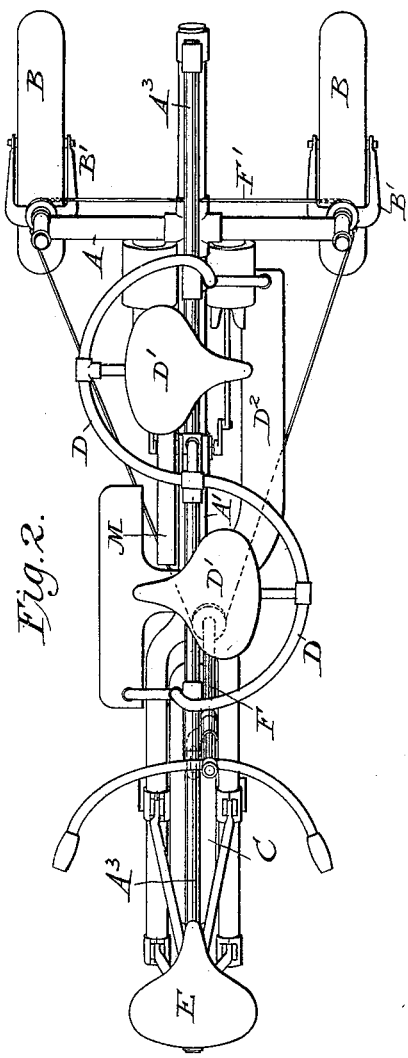
Witnesses
C. B. Bull
H. Hollingworth
Inventor
Edward J. Pennington
by G. W. T. Board
Attorneys
THE NORRIS PETERS CO., PHOTO-LITHO., WASHINGTON, D. C.

No. 627,523.　　　　　　　　　　　　　　　Patented June 27, 1899.
E. J. PENNINGTON.
MOTOR VEHICLE.
(Application filed Dec. 30, 1897.)
(No Model.)　　　　　　　　　　　　　　　2 Sheets—Sheet 2.
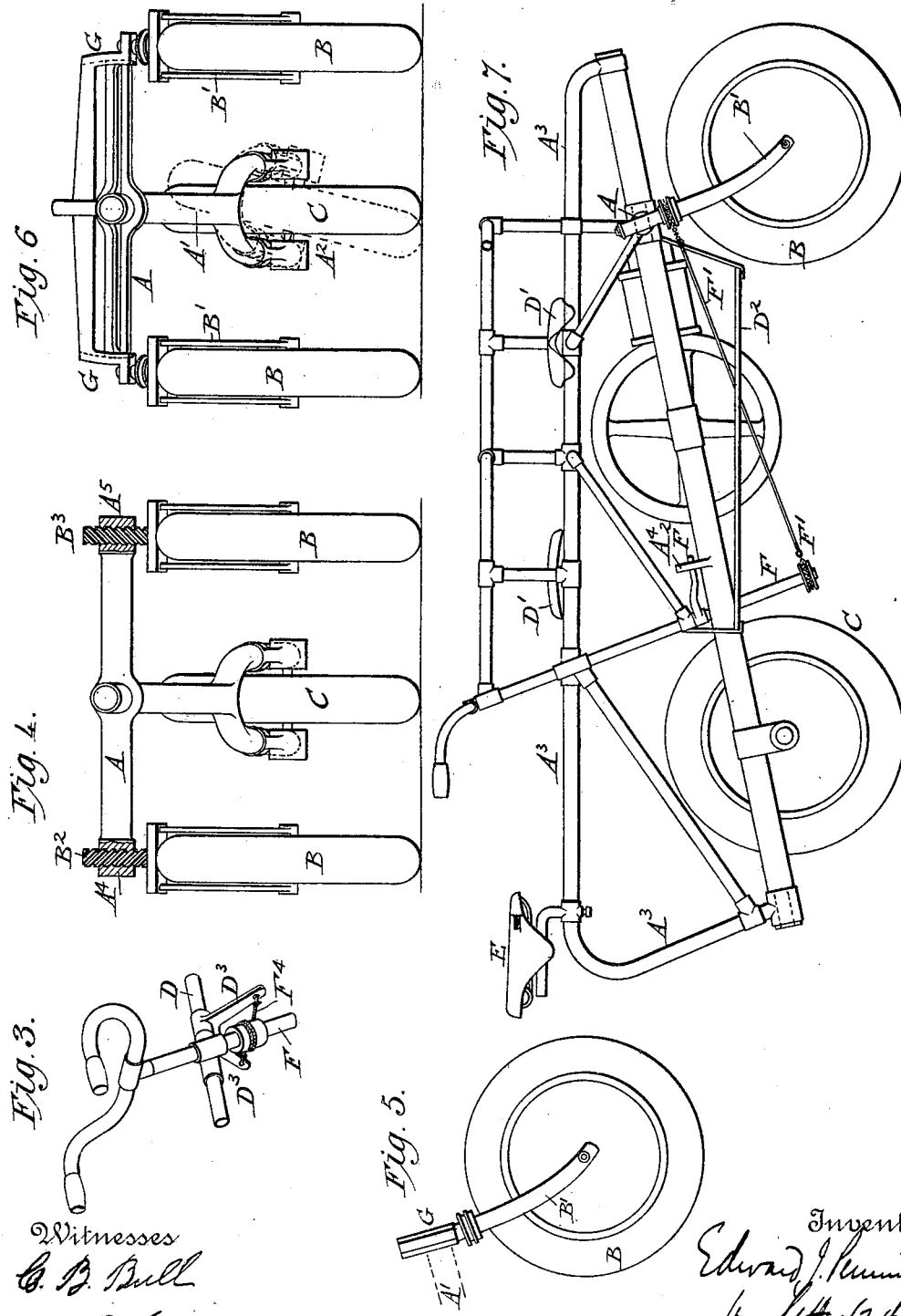

UNITED STATES PATENT OFFICE.

EDWARD J. PENNINGTON, OF WALTON-UPON-THAMES, ENGLAND.

MOTOR-VEHICLE.

SPECIFICATION forming part of Letters Patent No. 627,523, dated June 27, 1899.

Application filed December 30, 1897. Serial No. 664,736. (No model.)

*To all whom it may concern:*

Be it known that I, EDWARD J. PENNINGTON, a citizen of the United States, residing at Walton-upon-Thames, in the county of Surrey, England, have invented certain new and useful Improvements in or Relating to the Steering of Vehicles, particularly Motor-Vehicles, (for which I have obtained a patent in Great Britain, No. 16,969, dated July 31, 1896,) of which the following is a full, clear, and exact description.

This invention relates to the steering of vehicles, especially motor-vehicles, being particularly applicable to tricycles, since one of the objects which I seek to attain by its use is to increase the safety or stability of the vehicle in going around corners.

I will describe the invention as applied to a tricycle or three-wheeled vehicle.

The object of the invention is to throw the center of gravity of the vehicle or the passengers or load, or both, toward the center of the circular arc described by the vehicle, so as to counteract the centrifugal force operating in the opposite direction. This effect may be obtained either by tilting the necessary parts of the apparatus so as to relatively lower those parts to the inside of the curve and to raise those to the outside of the curve, or it may be effected by bodily moving the necessary portions, particularly the load, to that side of the vehicle adjacent to the inside of the curve. Various mechanical devices may be employed to effect this purpose.

The framework of the tricycle may be of a rigid T shape, the two leading steering-wheels being carried upon the cross and the driving-wheel in a fork at the back of the stem of the T. Upon this framework, which may be permanent in its relation to the carrying-wheels, is pivoted the frame or platform which carries or forms the seating accommodation of the vehicle. The pivoting would be upon a longitudinal axis, so that the seats would tilt to the right or left of the central line of the vehicle. The movement may be effected by inclined planes, cranks, levers, or the like, preferably connected directly or indirectly with the steering mechanism, so that when the steering apparatus is turned to direct the vehicle in a curve to the right hand the seat or seats at that side of the vehicle will be lowered and the seat or seats at the other side of the vehicle will be raised, and vice versa.

In the case particularly of a vehicle intended always to go around curves in the same direction, as in the case of a pacing-vehicle for cycle-tracks, the seating arrangement may be pivoted at one side of the vehicle and the other side either raised or lowered, the effect being substantially the same as that already described.

If preferred, the whole frame may be moved in relation to the wheels, particularly the two steering-wheels, the forks containing which may be connected with the T or equivalent frame by vertical slides, which may be set to a circular sweep, so that while the wheels maintain their same positions in relation to the ground the T-frame would vary, one side approaching the ground and the other receding from it.

Where it is desired to affect the driving portion of the vehicle only, the stem of the T may be jointed or the connection between the T and the cross may be jointed, so as to allow of the necessary movement of the back or driving portion of the frame in relation to the front portion of the frame, which would carry the seating accommodation and would always remain substantially parallel to the ground.

Where the load is moved bodily sidewise, the movable portion may be carried upon slides, slings, links, or equivalent and moved by any convenient arrangement of levers, screws, or other suitable devices operating, as before, in conjunction with the steering.

It will easily be appreciated that the invention can be applied in a more or less similar manner to vehicles with more than three wheels.

The invention will be best understood by reference to the accompanying drawings, in which—

Figure 1 is a side elevation, and Fig. 2 a plan, of a Pennington motor-tricycle provided with one form of my improved tilting apparatus. Fig. 3 is a front elevation of an alternative form of a detail of the machine shown in Figs. 1 and 2. Fig. 4 is a front elevation of a motor-cycle having an alternative construction of tilting apparatus. Figs. 5 and 6 are respectively a side elevation and an end or front elevation of part of a motor-tricycle provided with a second form of the apparatus. Fig. 7 is a side elevation of a tricycle provided with a further form of the apparatus.

Like letters indicate like parts throughout the drawings.

As shown in Figs. 1 and 2, the framework A A' of the tricycle may be substantially of a rigid T shape, the two leading or steering wheels B being carried in forks B', pivoted in or to the cross or member A of the T, and the rear or driving wheel C being carried in a fork $A^2$, formed in or connected to the stem or member A' of the T. Upon the bar or tube $A^3$, rigidly connected to or forming an integral part of the T-frame A A', is pivoted a frame or platform D, carrying seats or saddles D' and foot-boards $D^2$ or otherwise arranged for providing the necessary seating accommodation. The bar or tube $A^3$ is situated in the longitudinal central plane of the vehicle, so that the seats D' may tilt to the right and left of the central line of the vehicle. At the back of the vehicle is provided a saddle E for the steersman. This saddle is secured to the bar or tube $A^3$ and, unlike the saddles D', has no tilting motion. The steering-pillar F may be connected to the steering-forks B' by chain-gear F' and connected by any convenient gearing with the tilting frame or platform D. In Fig. 1 it is shown as provided with a preferably forked or slotted arm $F^2$, which engages an arm $D^3$ of the frame D, projecting downward beneath the bar or tube $A^3$. By this arrangement when the steering-pillar F is turned to direct the vehicle in a curve to, say, the right hand the seat D (or seats, if more are provided) at the right-hand side of the vehicle will be lowered and the seat (or seats) at the left-hand side of the vehicle will be raised, or vice versa. As an alternative connection between the parts F and D, there could be a drum $F^3$ on the steering-pillar F, connected by a chain $F^4$ to arms $D^3$ on the frame D in the manner indicated in Fig. 3, so that on rotation of the steering-pillar F the chain $F^4$ cants the frame to one side or the other by means of the arms $D^3$.

M is the motor, which is mounted on the stem A' of the T and from which motion is transmitted to the driving-wheel B through any suitable gearing.

In the case particularly of a vehicle intended always to go around curves in the same direction—as, for example, a pacing-vehicle for cycle-tracks—the seating arrangement or frame may be pivoted at one side of the vehicle and the other side of the seat-frame either raised or lowered, the effect being substantially the same as that previously described with reference to Figs. 1 and 2.

In the construction shown in Fig. 4 the forks have stems $B^2 B^3$, upon which are quick-threaded screws, engaging with similar screws formed on the interior of sockets or fork-bearings $A^4 A^5$, fixed at the ends of the transverse frame member A. The screws on the stems $B^2 B^3$ are threaded reversely—that is to say, if the screw on the stem $B^2$ is left-handed that on the stem $B^3$ is right-handed. By this construction the stems $B^2 B^3$, when rotated together by the operation of the steering-gear, screw one end of the transverse member A up and the other end down, thereby canting the whole body of the machine to one side or the other, as desired. Instead of the screw-threaded stems $B^2 B^3$ cams could be employed and controlled by the steering-gear for canting the frame relatively to the steering-wheel forks in like manner.

As shown in Figs. 5 and 6 the steering-forks B' are connected to the frame member A by vertical slides G, which, as shown in Fig. 5, may be set to a circular sweep, so that while the steering-wheels B maintain their position in relation to the ground the frame A A' would vary, one end of the transverse member A thereof approaching the ground and the other receding from it, and the driving-wheel C being also inclined, all as shown in dotted lines in Fig. 6.

In Fig. 7 I have represented an arrangement wherein only the driving portion of the vehicle is affected when traveling in a curve. In this example the stem or member A' of the T-frame is pivoted at its front end in the member A and at its rear end conveniently in the tube or frame $A^3$, on or to which seats D' are rigidly attached, and the member A' is provided with an arm $A^4$, with which engages an arm $F^2$ on the steering-pillar F. When the steering-pillar F is turned to direct the vehicle in a curve, the arm $F^2$ acting on the arm $a^4$ causes the driving-wheel C and the motor M to be canted over so as to throw the center of gravity of the vehicle toward the center of the circular arc described by the vehicle, the steering-wheels throughout this operation maintaining their perpendicularity in relation to the ground.

It is not necessary that the devices by which the movement of the center of gravity is effected should be directly connected with the steering mechanism. The desired result would be obtained if the mechanism for shifting the center of gravity were controlled independently of but operative in conjunction with the steering mechanism.

What I claim, and desire to secure by Letters Patent of the United States, is—

1. In a self-propelled vehicle, the combination of a frame carrying the motive apparatus and the driving wheel or wheels, a second frame pivoted to the first frame in the longitudinal center of the vehicle, and means for rocking one frame with respect to the other, the steering-wheels standing at all times in an upright position, substantially as set forth.

2. In a self-propelled vehicle, the combination of a frame carrying the motive apparatus, the driving wheel or wheels, and the support for the steering-wheels, a second frame for carrying passengers or freight pivoted to the first frame in the longitudinal center of the vehicle, and means for rocking one frame with respect to the other, the steering-wheels standing at all times in an upright position, substantially as set forth.

3. In a self-propelled vehicle, the combination of a frame carrying the motive apparatus, the driving wheel or wheels, and the support for the steering-wheels, a second frame for carrying passengers or freight, pivoted to the first frame in the longitudinal center of the vehicle, and means for rocking one frame with respect to the other by the act of steering, the steering-wheels standing at all times in a substantially perpendicular position, as set forth.

4. In a self-propelled vehicle the combination with the fork-bearing or other support for one or more of the road-wheels, of a screw or cam device for the purpose of raising or lowering that side or portion of the vehicle.

5. In a self-propelled vehicle, the herein-described means of tilting the frame or a part thereof by means of screws upon or operated by one or more of the steering-forks for the purpose described.

6. In a self-propelled vehicle the combination of a steering-fork or other support for a steering-wheel, a worm or cam and a connection with the steering mechanism of the vehicle for the purpose of altering the level of one or both sides of the vehicle, substantially as described.

7. In a self-propelled vehicle the combination of two steering-forks having worms or cams so arranged that as the forks are turned they raise or lower their respective sides or parts of the vehicle, and a chain and chain-wheel connection to the steering mechanism substantially as and for the purpose described.

EDWARD J. PENNINGTON.

Witnesses:
ARTHUR B. SEIBOLD,
SIDNEY P. HOLLINGSWORTH.